March 31, 1936.        R. M. JOHNSON        2,035,548
VALVE
Filed March 5, 1935        2 Sheets-Sheet 1
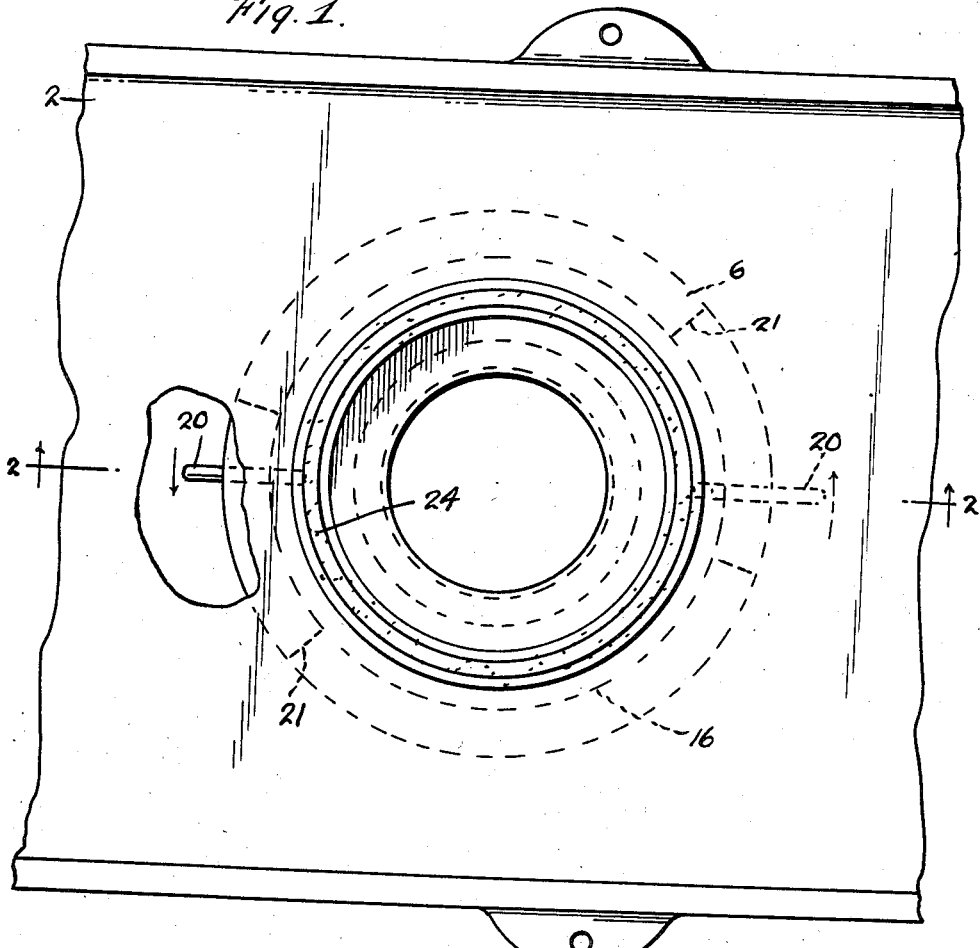
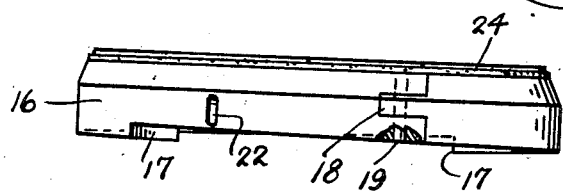
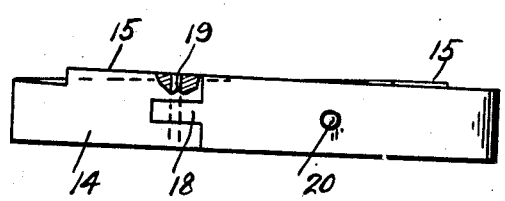
Inventor
R. M. Johnson
By Clarence A. O'Brien
Attorney March 31, 1936.    R. M. JOHNSON    2,035,548
VALVE
Filed March 5, 1935    2 Sheets-Sheet 2

Inventor
R. M. Johnson
By Clarence A. O'Brien
Attorney

Patented Mar. 31, 1936

2,035,548

UNITED STATES PATENT OFFICE 2,035,548

VALVE

Ray M. Johnson, Birch Run, Mich.

Application March 5, 1935, Serial No. 9,480

3 Claims. (Cl. 251—167)

This invention relates to a valve which is mainly designed for oil or other wells, the present invention being an improvement over that forming the subject matter of a patent granted to me on April 3, 1934, No. 1,953,828. The general object of the present invention is to provide means for insuring a fluid-tight joint between the valve member and the under part of the valve casing, when the valve member is in closed position.

This invention also consists in certain other features of construction and in the combination and arrangement of several parts to be hereinafter fully described, illustrated in the accompanying drawings and specifically pointed out in the appended claims.

In describing the invention in detail, reference will be had to the accompanying drawings wherein like characters denote like or corresponding parts throughout the several views, and in which:

Fig. 1 is a top plan view of the lower section of the valve casing with the valve removed and the parts broken away.

Fig. 4 is an elevation of the ring which carries the gasket.

Fig. 5 is a view of the rotary ring for operating the first mentioned ring.

Figure 2:
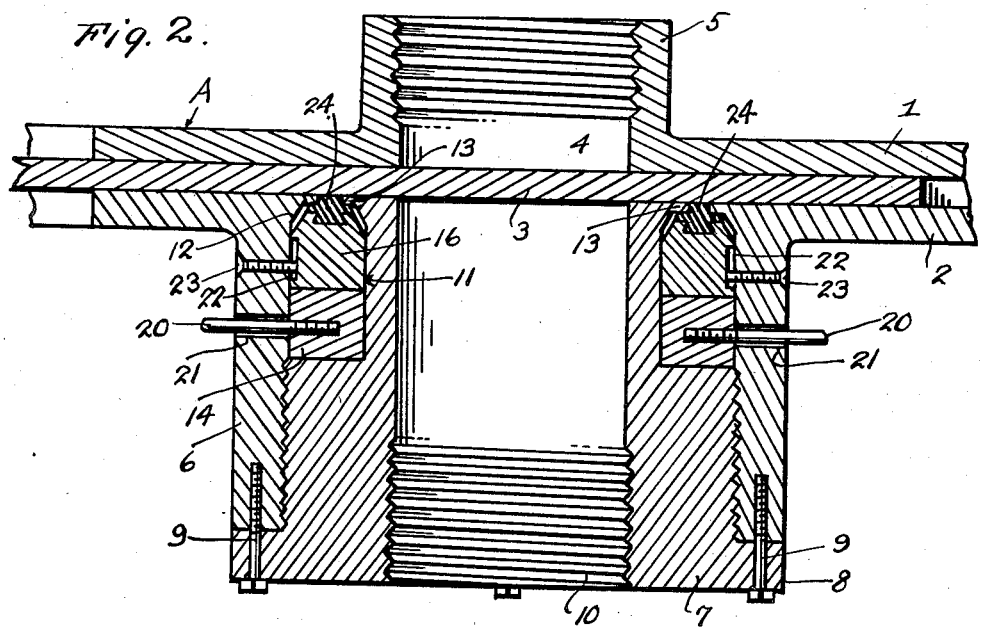
Fig. 2 is a section on line 2—2 of Fig. 1, but with the casing in section and with the gate in closed position.
Figure 3:
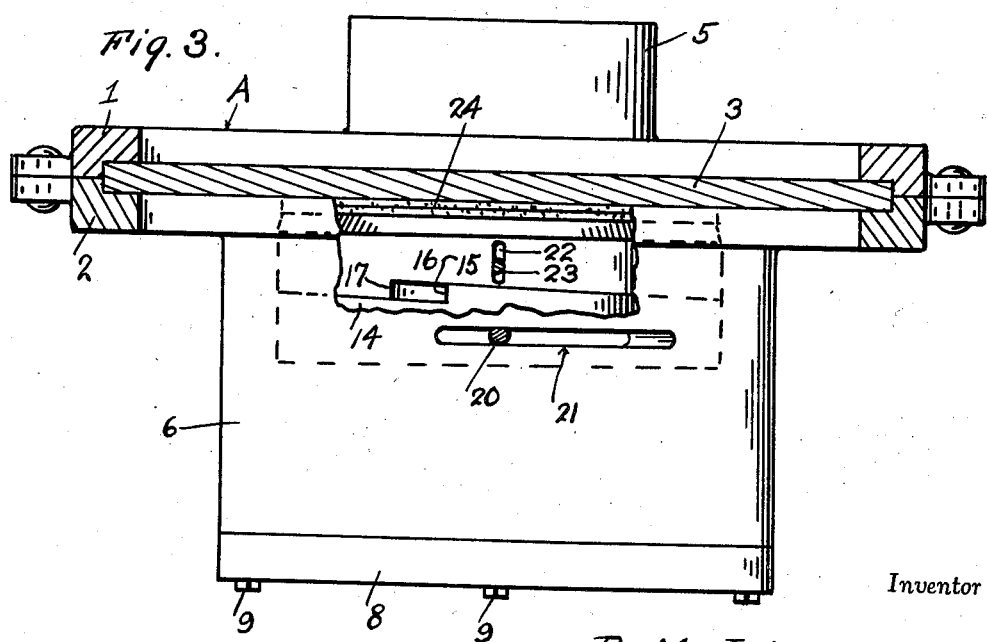
Fig. 3 is an elevation with the valve casing and gate in section and with parts broken away.

In these drawings, the letter A indicates the valve casing or housing which is formed of the upper section 1 and the lower section 2, the sections slidably receiving between them the gate 3 which closes the passage 4 vertically arranged in the casing and a part of which is formed by the upper nipple 5 connected with the section 1 and receiving the discharge pipe.

In carrying out my invention, I form a depending sleeve or tubular part 6 on the lower section 2, the lower portion of the sleeve being internally threaded as shown and a bushing 7 is adapted to be inserted in the sleeve or tubular part 6 and has its lower portion exteriorly threaded to engage the internal threads of the sleeve 6 and the lower end of the bushing is formed with a flange 8 which abuts the lower end of the sleeve and the parts are fastened together by the bolts 9. The bushing is interiorly threaded at its lower part as shown at 10 for receiving the well pipe or a reducer or the like. The upper end of the bushing 7 is in alignment with the upper face of the section 2 and the upper portion of the bushing is reduced to form an annular chamber 11, the outer wall of which is formed by the upper part of the sleeve 6. The side walls of the chamber at the top thereof converge as shown at 12 and then are straight to form the shoulders 13, the space between the two shoulders opening out through the top of the members 6 and 7. A sectional cam ring 14 is rotatably arranged in the lower part of the chamber, the upper edge of the ring being formed with the cam parts 15 and a second sectional ring 16 is located in the upper part of the chamber and has the cam parts 17 on its lower edge for cooperating with the cam parts 15. The sections of each ring are connected together by the tongue and groove joints shown generally at 18 and a pin 19 connects these parts together.

Pins 20 are threaded in holes formed in the lower ring 14 and project through circumferentially extending slots 21 in the sleeve 6 so that these pins can be engaged by a suitable tool to impart rotary movement to the lower ring 14. When this is done and the ring turned in one direction, its cam parts 15 engage the cam parts 17 of the upper ring 16 will raise said ring and when the lower ring is turned in the opposite direction, the upper ring will be lowered.

Vertical grooves 22 are formed in the upper ring and screws 23 pass through threaded holes in the sleeve 6 with their inner ends engaging these grooves so that the screws will prevent turning movement of the upper ring while permitting it to move vertically.

The upper edge of the upper ring 16 is beveled as shown to conform to the converging upper walls 12 of the chamber and said upper edge is formed with the dove-tailed shaped groove to receive the correspondingly shaped lower part of a gasket 24. The upper part of the gasket is of such shape as to pass between the shoulders 13 and said gasket has wings at its sides which rest on the flat top part of the ring 16 so that when the upper ring is in raised position the top part of the gasket will pass between the shoulders 13 and press against the lower face of the gate 3 and the wings will be pressed between the lower faces of the shoulders 13 and the top portions of the ring 16 and thus the gasket will prevent leakage between the lower face of the gate and the casing drawn downwardly around the rings.

The tool used for turning the lower ring may be of any suitable form though it should engage both pins 20 in order to impart rotary movement to the lower ring.

As will be understood, both rings are in lowered position when the gate is closing and after the gate has been closed, the lower ring is rotated to raise the upper ring so that the gasket 24 will press firmly against the lower face of the gate to make a fluid-tight junction with the gate. When the gate is to be opened, the lower ring is turned in a reverse direction so that the upper ring will move downwardly and the gate can be opened without interference from the gasket.

It is thought from the foregoing description that the advantages and novel features of the invention will be readily apparent.

It is to be understood that changes may be made in the construction and in the combination and arrangement of the several parts, provided that such changes fall within the scope of the appended claims.

I claim:

1. In a valve assembly of the class described including a casing having an inlet nipple and a gate slidably arranged in the casing and controlling the flow of fluid through the casing from said inlet nipple, said inlet nipple including a sleeve having its outer part internally threaded, a bushing threaded in the sleeve, means for fastening the bushing in the sleeve, said bushing having an annular chamber in its inner portion, one wall of which is formed by the sleeve, a pair of rings in the chamber, one ring having a gasket mounted therein for engaging the gate when the ring is moved towards the gate, cam parts on the rings for moving the gasket-carrying ring towards the gate when the other ring is partly rotated, pins fastened to the said other ring, the sleeve having circumferential slots through which the pins pass, and means for preventing rotary movement of the gasket-carrying ring.

2. In a valve assembly of the class described including a casing having an inlet nipple and a gate slidably arranged in the casing and controlling the flow of fluid through the casing from said nipple, a chamber of annular shape formed in the inlet nipple and opening out into the casing, said chamber having inwardly extending shoulder-forming parts at its upper end, a ring located in the chamber, a gasket carried by the upper portion of the ring and having a portion for extending between the shoulders into contact with the gate when the ring is raised and other portions for engaging the shoulders when the ring is raised, and means for adjusting said ring vertically.

3. In a valve assembly of the class described including a casing having an inlet nipple and a gate slidably arranged in the casing and controlling the flow of fluid through the casing from said nipple, a chamber of annular shape formed in the inlet nipple and opening out into the casing, a ring located in the upper part of the chamber, a gasket carried by the upper portion of the ring, cams on the lower edge of the ring, a second ring rotatably located in the chamber, cams on the upper edge of the second ring cooperating with the cams of the first ring for raising the first ring when the second ring is partly rotated in one direction, means for preventing rotary movement of the first ring, a handle member connected with the second ring, and a side portion of the inlet nipple having an opening therein through which the handle member extends.

RAY M. JOHNSON.